(12) United States Patent
White

(10) Patent No.: US 6,681,490 B2
(45) Date of Patent: Jan. 27, 2004

(54) AXLE HUB RE-PACKING APPARATUS

(75) Inventor: David Richard White, Fayette, AL (US)

(73) Assignee: Continental Conveyor and Equipment Company, Winfield, AL (US)

( * ) Notice: Subject to any disclaimer, the term of this patent is extended or adjusted under 35 U.S.C. 154(b) by 123 days.

(21) Appl. No.: 10/104,228

(22) Filed: Mar. 22, 2002

(65) Prior Publication Data

US 2003/0178256 A1 Sep. 25, 2003

(51) Int. Cl.[7] ............................................. F01M 11/04
(52) U.S. Cl. .................. 29/898.1; 29/402.18; 29/281.1; 29/898; 184/5.1; 184/105.1; 184/105.2
(58) Field of Search ............................. 29/898.1, 281.1, 29/402.18, 527.2, 527.1, 458, 724, 802, 898; 184/5.1, 105.1, 105.2; 384/322, 369, 371, 372, 373, 377, 390, 398, 399

(56) References Cited

U.S. PATENT DOCUMENTS

| | | | |
|---|---|---|---|
| 3,578,281 A | 5/1971 | Nielson et al. | |
| 4,926,972 A | * 5/1990 | Yoshioka et al. | |
| 4,971,355 A | 11/1990 | Studdard | |
| 5,109,955 A | * 5/1992 | Clark | |
| 5,125,146 A | 6/1992 | Ferrari | |
| 5,228,182 A | 7/1993 | Hart | |
| 6,024,418 A | 2/2000 | Ebert | |
| 6,155,380 A | * 12/2000 | Ichikawa et al. | |

FOREIGN PATENT DOCUMENTS

WO      00/78587    * 12/2000

* cited by examiner

*Primary Examiner*—Gregory Vidovich
*Assistant Examiner*—Eric Compton
(74) *Attorney, Agent, or Firm*—Pearne & Gordon LLP

(57) ABSTRACT

A method and apparatus for packing wheel bearings with grease. A frame is provided for supporting an axle assembly comprising an axle shaft with a wheel mounted on a wheel bearing at each end. A horizontally mounted ram and cylinder is mounted adjacent each wheel. Each ram has a greasing head at its distal end and each head has a nose portion adapted to pivot relative to a body portion. Each nose portion has an open-mouthed greasing chamber. Each ram is advanced toward each wheel so that each open-mouthed greasing chamber is in communication with a wheel bearing. Pressurized grease is delivered to a greasing chamber and, therefor, to a bearing.

11 Claims, 5 Drawing Sheets

AXLE HUB RE-PACKING APPARATUS

FIELD OF THE INVENTION

This invention relates generally to a method and apparatus for re-packing axle hubs, particularly large heavy duty axles for mobile homes.

BACKGROUND OF THE INVENTION

Large heavy duty trailer axles, such as those utilized on mobile homes, are typically one-piece units having spindles integrally formed at each end of a generally hollow tube attached to a hub. The hubs contain bearings having grease which over a period of time and use become worn and need to be re-packed with grease.

One known method for re-packing worn out axles is to re-pack the hub by hand. This method is time consuming and costly.

SUMMARY OF THE INVENTION

The present invention is an apparatus to re-pack axle hubs with grease, particularly mobile home axle hubs. This re-packing operation may be conducted in conjunction with an overall reconditioning of an axle wherein the axle leaf springs are bent back to their original tolerances and the axle is bent back to its original camber.

It is one important aspect of this invention to provide an apparatus that can automatically re-pack and re-grease an axle hub.

In accordance with another aspect of this invention, it is further desirable to provide a re-greasing nozzle that can swivel such that the nozzle can seat on the hub bore and seal the connection between the nozzle and the hub bore.

These and other aspects of this invention are illustrated in the accompanying drawings, and are more fully disclosed in the following specification.

DESCRIPTION OF AN EMBODIMENT OF THE INVENTION

Figure 1:
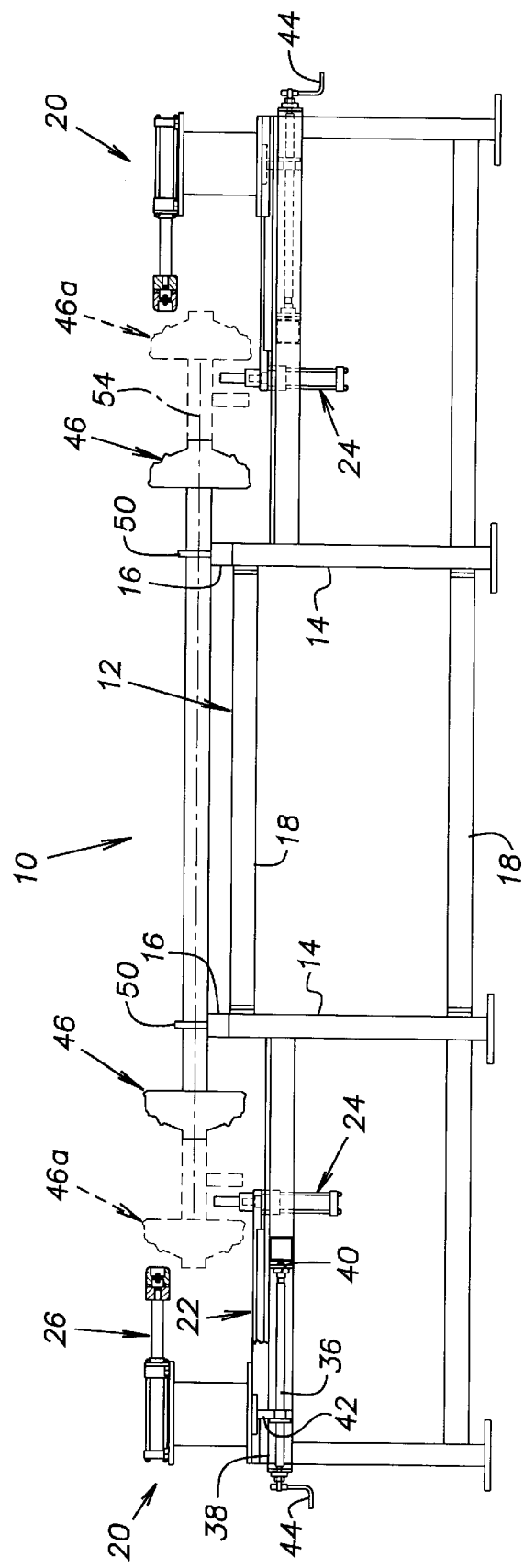
FIG. 1 is front elevation view of the axle hub re-packing apparatus of the present invention.
Figure 2:
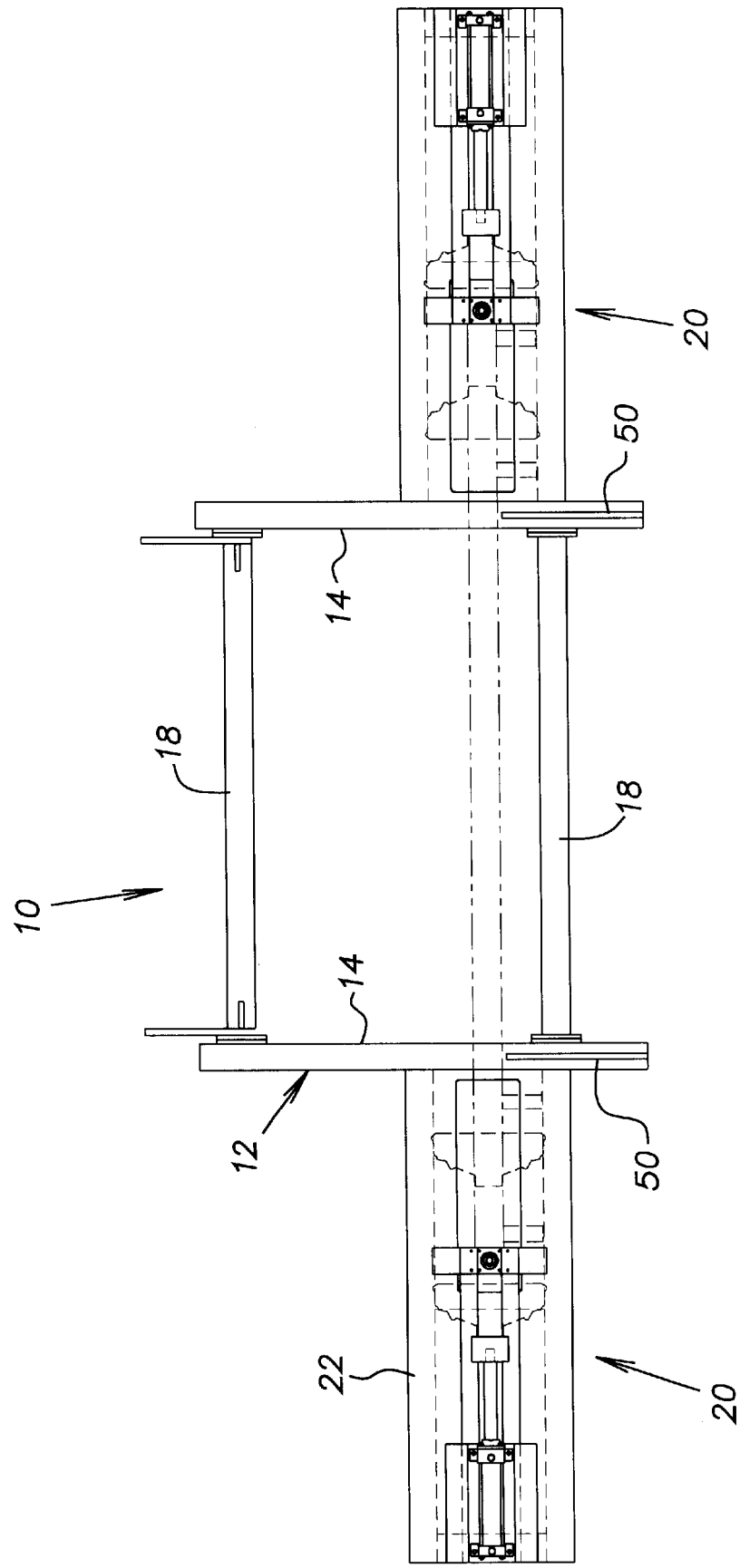
FIG. 2 is a top view of the of the axle hub re-packing apparatus of the present invention.
Figure 3:
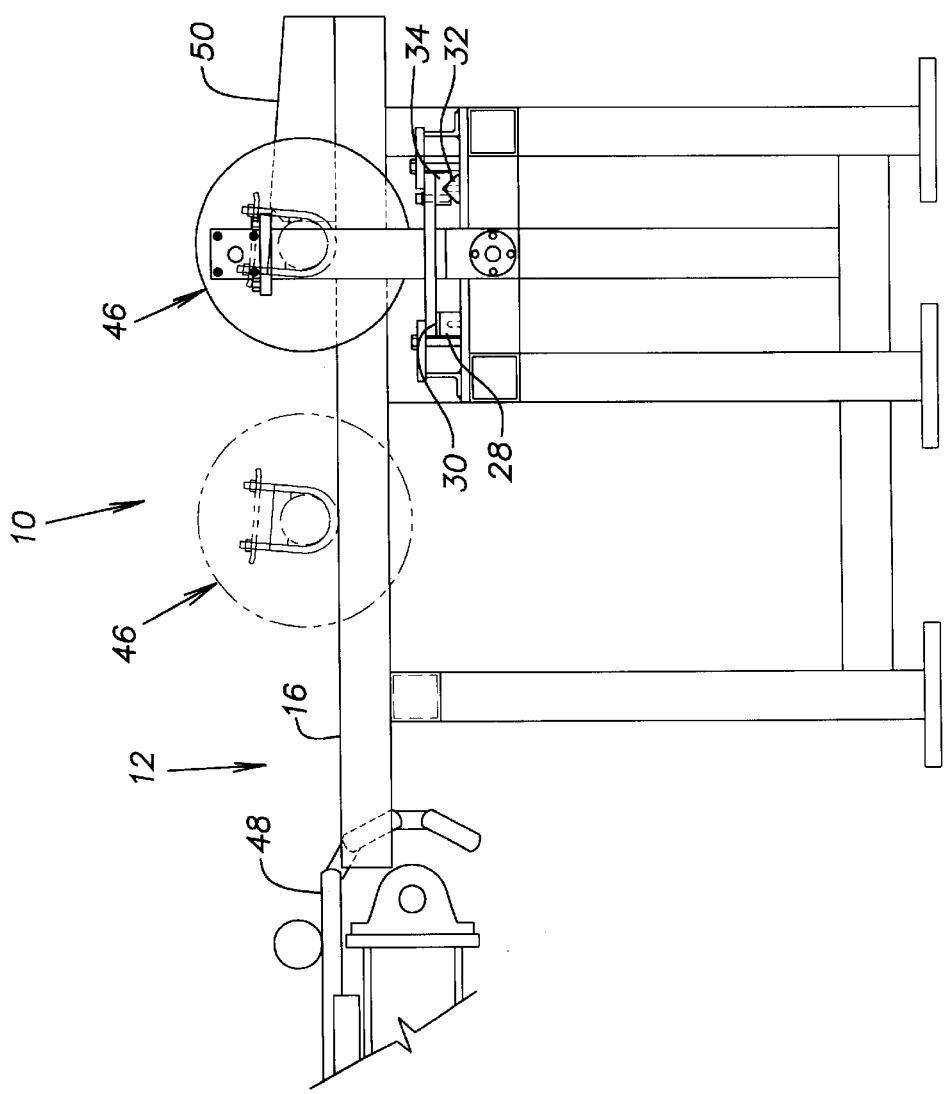
FIG. 3 is a left side view of the axle hub re-packing apparatus of the present invention.

Referring now to the drawings and, particularly, to FIGS. 1 through 4, an axle bearing repacking assembly 10 is illustrated. The assembly 10 includes a central conveying frame 12 which includes support legs 14, top rails 16 and cross connectors 18.

The assembly 10 includes identical grease repacking stations 20 at a forward end of the frame 12. Each repacking station 20 includes a table 22, an axle support ram and cylinder 24, and an axle bearing repacking ram and cylinder 26. The axle support ram and cylinder 24 is mounted on the table 22, as is the repacking ram and cylinder 26. The table 22 is, in turn, mounted on a rail system (FIG. 3) which includes a square way 28 with a bronze plate 30 on its top surface, and further includes a v-rail 32 which rides on a V-track 34.

The table 22 may be advanced and retracted by means of a screw shaft 36 which is rotatably mounted between bearings 38 and 40 and which is threaded through a depending plate 42 on the underside of the table 22. Cranking a handle 44 at the end of the shaft 36 causes the table 22 to advance and retract.

Axle assemblies 46 are delivered to the repacking stations 20 from a previous reconditioning station (not shown) by a loading conveyor 48. An axle assembly 46 is moved along the top rails 16 of the conveying frame 12 by operators stationed on either side of the frame 12 until it reaches a pair of vertical plates 50 on the rails 16. It may be noted that the repacking assembly 10 is adapted to accommodate axle assemblies that are sized between the assembly 46, shown in solid outline in FIG. 1, and the assembly 46a, shown in phantom outline in FIG. 1. If the axle assembly 46a is being reconditioned, the operators actuate the axle support rams 24 to drive ram cradles 52 (FIG. 4) upwardly to lift the axle assembly 46a upwardly from the rails 16.

Figure 6:
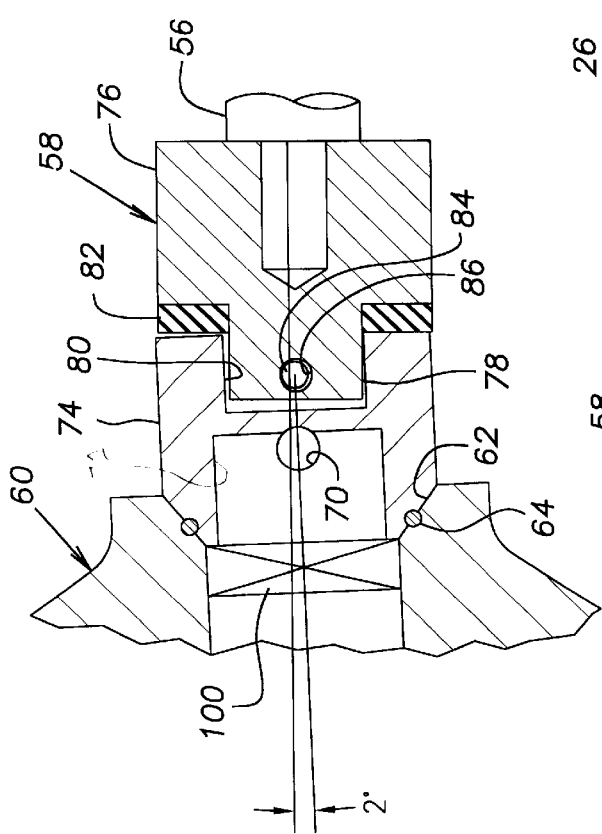
FIG. 6 is an enlarged view of the re-packing nozzle on a re-packing station on the hub re-packing apparatus of the present invention.
Figure 5:
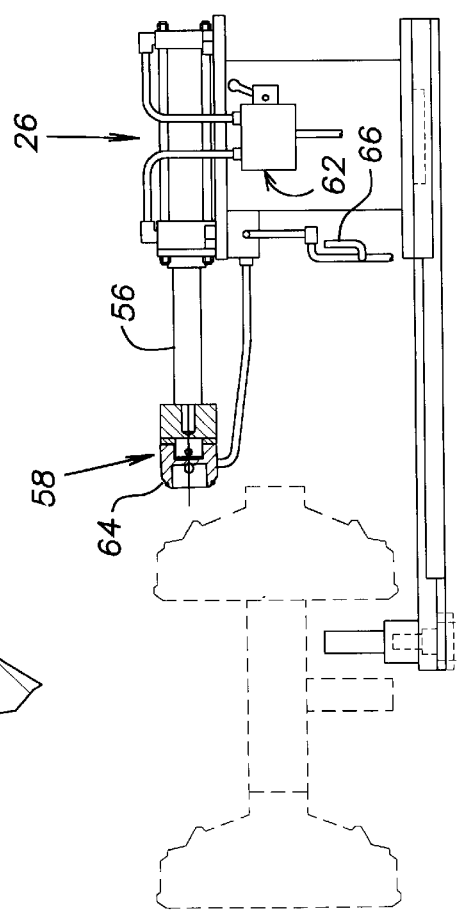
FIG. 5 is a side elevation view, partly in section, of a re-packing station on the hub re-packing apparatus of the present invention.

The axle assembly 46a is raised until its longitudinal axis 54 is aligned with the longitudinal axis of the repacking ram and cylinder 26. Each operator advances a ram 56 of the assembly 26 until a greasing head 58 on the distal end of the ram engages a wheel 60 to be repacked with grease (FIG. 6). The ram 56 is advanced and retracted by fluid power controlled by a selector valve 62.

The greasing head 58 is advanced into a mouth 62 of the wheel 60 and is sealed thereto by an O-ring 64 in the head 58. To accommodate for any misalignment of the head 58 and the mouth 62, the head 58 includes a nose portion 74 which is adapted to pivot about 20 relative to a body portion 76 of the head, as is indicated in FIG. 6. To this end there is provided a projection 78 on the body portion 76 which loosely fits into a socket 80 on the nose portion 74. An impact washer 82 is provided which serves as a cushioning spring to hold the nose 74 in any adjusted position. The nose 74 is pivoted to the head 58 by a pin 84 which extends through and is fixed to the nose portion 74 and which loosely extends through a bore 86 in the projection 78. With the head 58 in place, the operator grasps a valve handle 66 and a metered amount of pressurized grease is forced through a passage comprising a hose 68 and an aperture 70 to an open-mouthed greasing chamber 72 in the nose portion 74 and to a wheel bearing 100.

Figure 4:
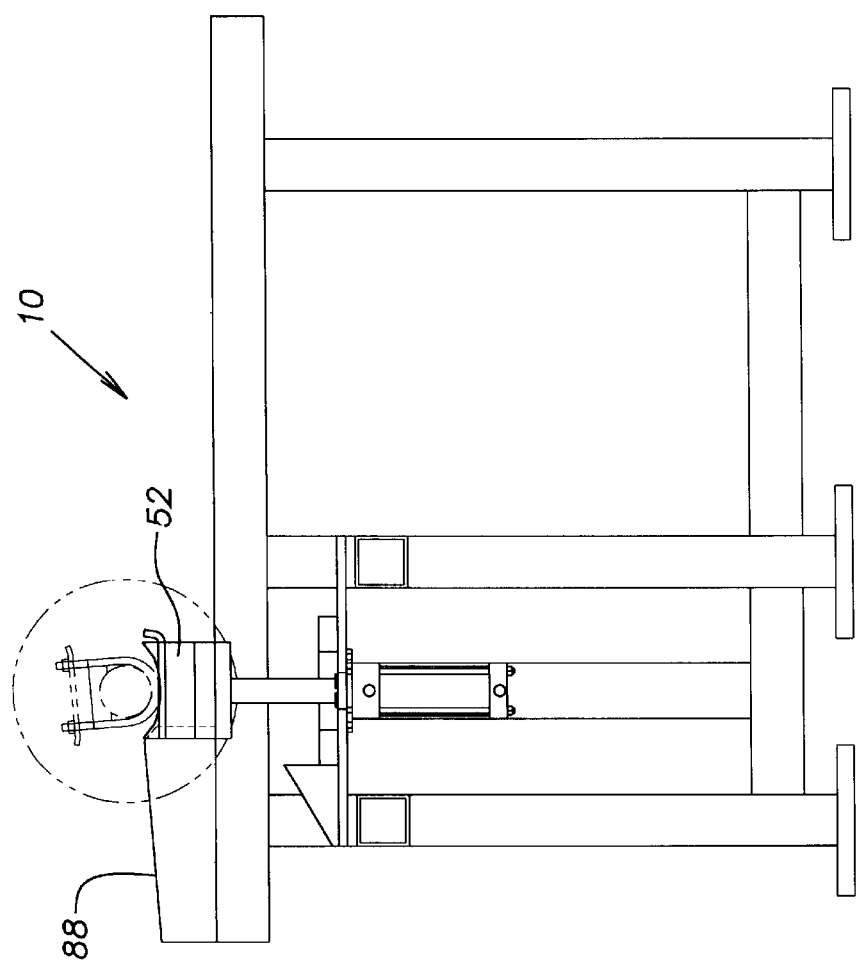
FIG. 4 is a right side view of the axle hub re-packing apparatus of the present invention.

After both operators have greased their respective hubs, they retract the heads 58 to their initial positions. While the axle is still in the raised position, both operators push the axle down a discharge ramp 88 (FIG. 4).

To accommodate the axle assembly 46 (or an axle assembly sized between the assemblies 46 and 46a) the operators may crank the handles 44 to advance the tables 22 to a position that will enable the ram cradles 52 and the rams 56 to perform the functions previously described with respect to the axle assembly 46a.

The invention has been described using specific examples; however, it will be understood by those skilled in the art that various alternatives may be used and equivalents may be substituted for elements described herein, without deviating from the scope of the invention. Modifications may be necessary to adapt the invention to a particular situation or to particular materials without departing from the scope of the invention. It is intended that the invention not be limited to the particular implementation described herein, but that the claims be given their broadest interpretation to cover all embodiments, literal or equivalent, covered thereby.

What is claimed is:

1. Apparatus for packing wheel bearings with grease comprising:
    a frame for supporting an axle assembly, said axle assembly comprising an axle shaft with a wheel mounted on a wheel bearing at each end;
    a repacking station adjacent at least one of said wheels, said repacking station comprising a ram and cylinder assembly;
    a greasing head on a distal end of said ram, said greasing head having a nose portion adapted to pivot relative to a body portion of said greasing head, said nose portion having an open-mouthed greasing chamber, said cylinder being adapted to advance said ram toward said wheel so that said open-mouthed greasing chamber is in communication with said wheel bearing during a greasing operation; and
    a passage for delivering pressurized grease to said greasing chamber and, therefor, to said bearing.

2. Apparatus according to claim 1 wherein a repacking station is located adjacent each of said wheels.

3. Apparatus according to claim 1 wherein an O-ring on said head seals against a mouth of said wheel during said greasing operation.

4. Apparatus according to claim 1 wherein said nose portion is adapted to pivot about 2° relative to said body portion.

5. Apparatus according to claim 1 wherein said body portion has a projection which loosely fits into a socket on said nose portion, a pin fixed to said nose portion extends through said projection, and an impact washer between said head and said body portion.

6. Apparatus for packing wheel bearings with grease comprising:
    a frame for supporting an axle assembly, said axle assembly comprising and axle shaft with a wheel mounted on a wheel bearing at each end;
    a repacking station adjacent at least one of said wheels, said repacking station comprising a stationary table, a moveable table slidably mounted on said stationary table, means to advance and retract said moveable table toward and away from an axle assembly supported on said frame, a horizontally mounted ram and cylinder assembly mounted on said moveable table, a greasing head on a distal end of said horizontally mounted ram, said greasing head having a nose portion adapted to pivot relative to a body portion of said greasing head, said nose portion having an open-mouthed greasing chamber, said cylinder being adapted to advance said horizontally mounted ram toward said wheel, a vertically mounted ram and cylinder assembly mounted on said movable table, a ram cradle at a distal end of said vertically mounted ram, said vertically mounted cylinder bring adapted to advance said vertically mounted cylinder upwardly so that said cradle engages said axle shaft to lift said axle shaft into substantial axial alignment with said horizontally mounted ram, said horizontally mounted cylinder being adapted to advance said horizontally mounted ram toward said wheel so that said open-mouthed greasing chamber is in communication with said wheel bearing during said greasing operation, and a passage for delivering grease to said greasing chamber, and, therefor, to said bearing.

7. Apparatus according to claim 6 wherein a repacking station is located adjacent each of said wheels.

8. Apparatus according to claim 6 wherein an O-ring on said head seals against a mouth of said wheel during said greasing operation.

9. Apparatus according to claim 6 wherein said nose portion is adapted to pivot about 2° relative to said body portion.

10. A method of packing wheel bearings with grease comprising the steps of:
    providing a frame for supporting an axle assembly comprising an axial shaft with a wheel mounted on a wheel bearing at each end;
    delivering an axle assembly to said frame;
    providing a horizontally mounted ram and cylinder adjacent at least one of said wheels at a repacking station, said ram having a greasing head at its distal end, said greasing head having a nose portion adapted to pivot relative to a body portion of said greasing head, said nose portion having an open-mouthed greasing chamber;
    advancing said ram toward said wheel so that said open-mouthed greasing chamber is in communication with said wheel bearing; and
    delivering pressurized grease to said greasing chamber and, therefor, to said bearing.

11. A method of packing wheel bearings with grease comprising the steps of:
    providing a frame for supporting an axle assembly comprising an axle shaft with a wheel mounted on a wheel bearing at each end;
    delivering an axle assembly to said frame;
    providing a horizontally mounted ram and cylinder adjacent each of said wheels, each ram having a greasing head at its distal end, said greasing head having a nose portion adapted to pivot relative to a body portion of said greasing head, said nose portion having an open-mouthed greasing chamber;
    lifting the axle assembly from said frame and supporting said axle assembly in substantial axial alignment with each ram;
    advancing each ram toward each wheel so that each open-mouthed greasing chamber is in communication with said wheel bearing; and
    delivering pressurized grease to said greasing chamber and, therefor, to said bearing.

* * * * *